United States Patent
Araki

(10) Patent No.: US 11,230,642 B2
(45) Date of Patent: Jan. 25, 2022

(54) ONE-PART MOISTURE-CURABLE URETHANE COMPOSITION

(71) Applicant: Sika Hamatite Co., LTD., Hiratsuka (JP)

(72) Inventor: Kiminori Araki, Hiratsuka (JP)

(73) Assignee: Sika Hamatite Co., LTD.

( * ) Notice: Subject to any disclaimer, the term of this patent is extended or adjusted under 35 U.S.C. 154(b) by 74 days.

(21) Appl. No.: 16/337,899

(22) PCT Filed: Jun. 12, 2017

(86) PCT No.: PCT/JP2017/021653
§ 371 (c)(1),
(2) Date: Mar. 28, 2019

(87) PCT Pub. No.: WO2018/061335
PCT Pub. Date: Apr. 5, 2018

(65) Prior Publication Data
US 2020/0024448 A1    Jan. 23, 2020

(30) Foreign Application Priority Data

Sep. 28, 2016 (JP) .............................. JP2016-189865

(51) Int. Cl.
```
C08L 75/04    (2006.01)
C08G 18/10    (2006.01)
C08G 18/28    (2006.01)
C09D 175/04   (2006.01)
C09J 175/04   (2006.01)
```

(52) U.S. Cl.
CPC .............. *C08L 75/04* (2013.01); *C08G 18/10* (2013.01); *C08G 18/285* (2013.01); *C08G 18/2815* (2013.01)

(58) Field of Classification Search
None
See application file for complete search history.

(56) References Cited

U.S. PATENT DOCUMENTS

| | | |
|---|---|---|
| 2006/0079661 A1 | 4/2006 | Zhu et al. |
| 2008/0041522 A1 | 2/2008 | Zhu et al. |
| 2016/0251552 A1* | 9/2016 | Das .................. C08G 18/4202 428/221 |
| 2017/0058076 A1 | 3/2017 | Rubber |
| 2017/0158927 A1 | 6/2017 | Rubber |

FOREIGN PATENT DOCUMENTS

| | | | | |
|---|---|---|---|---|
| JP | S63-251459 | | 10/1988 | |
| JP | 2002-363240 | | 12/2002 | |
| JP | 2005075877 A | * | 3/2005 | ............ C09J 175/04 |
| JP | 2008-516057 | | 5/2008 | |
| JP | 2016160344 A | * | 9/2016 | ............ C09J 175/04 |
| WO | WO 2006/042305 | | 4/2006 | |
| WO | WO 2015/166610 | | 11/2015 | |
| WO | WO 2016/006501 | | 1/2016 | |

OTHER PUBLICATIONS

Machine translation of JP-2016160344-A (no date).*
Machine translation of JP-2005075877-A (no date).*
International Search Report for International Application No. PCT/JP2017/021653 dated Sep. 12, 2017, 3 pages, Japan.

* cited by examiner

*Primary Examiner* — Michael J Feely
(74) *Attorney, Agent, or Firm* — Thorpe North & Western

(57) ABSTRACT

The one-part moisture-curable urethane composition of the present technology includes: a urethane prepolymer (A) having an isocyanate group; at least one type of compound (B) selected from the group consisting of an aliphatic isocyanate compound and a modified product of the aliphatic isocyanate compound; and a monoalcohol compound (C) having a hydroxy group, the monoalcohol compound (C) being blended in an amount such that the amount of the hydroxy group in the monoalcohol compound (C) is from 0.025 to 0.4 mol per 1 mol of the isocyanate group in the urethane prepolymer (A).

10 Claims, No Drawings

ONE-PART MOISTURE-CURABLE URETHANE COMPOSITION

TECHNICAL FIELD

The present technology relates to a one-part moisture-curable urethane composition.

BACKGROUND ART

Various urethane resin compositions have been widely used as sealing agents, adhesives, and the like.

Known urethane resin compositions of this sort include two-part compositions containing a polyol compound and an isocyanate compound, and one-part compositions that are curable by moisture in the air or the like. However, one-part moisture-curable urethane compositions are easy to handle and do not need to be mixed and prepared on site. Thus, the use of such compositions has been increasing recently, for example.

Japan Unexamined Patent Publication 2002-363240, for example, discloses a "moisture-curable urethane composition including: a urethane prepolymer (A) obtained by reacting a diisocyanate compound with a polyether triol and/or a polyether diol having a number average molecular weight of 1000 to 7000 at a ratio such that the equivalent ratio of the isocyanate group/hydroxy group is from 1.1 to 2.5; and a polyurethane compound (B) obtained by capping 50% or less of the isocyanate groups of a polyurethane compound (b) at all terminal with a monoalcohol having from 1 to 22 carbons, the polyurethane compound (b) being obtained by reacting a polyester diol having a number average molecular weight of 1000 to 4000 obtained via a condensation reaction of 1,6-hexanediol and sebacic acid and/or dodecanedioic acid, with 1,6-hexamethylene diisocyanate at a ratio such that the equivalent ratio of isocyanate group/hydroxy group is from 1.5 to 2.5, the polyurethane compound (B) content being from 2 to 10 parts by mass per 100 parts by mass of the urethane prepolymer (A)" (claim 2).

However, it was found that the one-part moisture-curable urethane composition disclosed in Japan Unexamined Patent Publication 2002-363240 may exhibit a poor adhesiveness to the adherends depending on the type of adherend (coated plate) or adhesion conditions.

SUMMARY

The present technology provides a one-part moisture-curable urethane composition that exhibits a superior adhesiveness to adherends.

As the result of dedicated research regarding the problem described above, the inventors discovered that a one-part moisture-curable urethane composition including:

a urethane prepolymer (A) including an isocyanate group;

at least one type of compound (B) selected from the group consisting of an aliphatic isocyanate compound and a modified product of an aliphatic isocyanate compound; and a monoalcohol compound (C) including a hydroxy group, wherein the monoalcohol compound is blended in an amount such that the number of moles of hydroxy groups in the monoalcohol compound (C) per 1 mol of isocyanate groups in the urethane prepolymer (A) is within a specific range has a superior adhesiveness to adherends; thus, arriving at the present technology.

Specifically, the present inventors discovered that the problems described above can be solved by the following features.

[1]

A one-part moisture-curable urethane composition containing: a urethane prepolymer (A) including an isocyanate group;

at least one type of compound (B) selected from the group consisting of an aliphatic isocyanate compound and a modified product of an aliphatic isocyanate compound; and a monoalcohol compound (C) including a hydroxy group, the monoalcohol compound (C) being blended in an amount such that an amount of the hydroxy group in the monoalcohol compound (C) is from 0.025 to 0.4 mol per 1 mol of the isocyanate group in the urethane prepolymer (A).

[2]

The one-part moisture-curable urethane composition according to (1), wherein the monoalcohol compound (C) is blended in an amount such that the amount of the hydroxy group in the monoalcohol compound (C) is from 0.15 to 0.23 mol per 1 mol of the isocyanate group in the urethane prepolymer (A).

[3]

The one-part moisture-curable urethane composition according to (1) or (2), wherein the number of carbons in the monoalcohol compound (C) is from 1 to 18.

[4]

The one-part moisture-curable urethane composition according to any one of (1) to (3), wherein the aliphatic isocyanate compound is hexamethylene diisocyanate, and the modified product of the aliphatic isocyanate compound is a modified product of hexamethylene diisocyanate.

[5]

The one-part moisture-curable urethane composition according to any one of (1) to (4), wherein the modified product of the aliphatic isocyanate compound is at least one type of modified product selected from the group consisting of an isocyanurate of the aliphatic isocyanate compound, a biuret of the aliphatic isocyanate compound, and an adduct of the aliphatic isocyanate compound and a triol.

[6]

The one-part moisture-curable urethane composition according to any one of (1) to (5), further including an alkoxysilyl compound (D) including an alkoxysilyl group, a content of the alkoxysilyl compound (D) being from 0.08 to 10.2 parts by mass per total 100 parts by mass of the urethane prepolymer (A) and the compound (B).

[7]

The one-part moisture-curable urethane composition according to (6), wherein the alkoxysilyl compound (D) includes one or more active hydrogens per molecule, and the alkoxysilyl group includes at least one type of alkoxy group selected from the group consisting of a methoxy group and an ethoxy group.

According to the present technology, as will be demonstrated hereafter, a one-part moisture-curable urethane composition that exhibits a superior adhesiveness to adherends is provided.

DETAILED DESCRIPTION

The one-part moisture-curable urethane composition according to the present technology will be described hereafter.

Numerical ranges indicated using "(from) . . . to . . ." herein include the former number as a minimum value and the latter number as a maximum value.

One-Part Moisture-Curable Urethane Composition

The one-part moisture-curable urethane composition (hereafter also referred to simply as the "urethane composition") of an embodiment of the present technology includes: a urethane prepolymer (A) having an isocyanate group; at least one type of compound (B) selected from the group consisting of an aliphatic isocyanate compound and a modified product of an aliphatic isocyanate compound; and a monoalcohol compound (C) having a hydroxy group, the monoalcohol compound (C) being blended in an amount such that the amount of the hydroxy group in the monoalcohol compound (C) is from 0.025 to 0.4 mol per 1 mol of the isocyanate group in the urethane prepolymer (A).

The urethane composition of an embodiment of the present technology exhibits a superior adhesiveness to adherends; in particular, a superior adhesiveness to diverse adherends (especially coated plates, resins such as PBT, glass primers, etc.) in a wide range of adhesion conditions, from low temperatures to high temperatures.

From 2.5 to 40 mol % of the isocyanate groups in the urethane prepolymer (A) of the urethane composition according to an embodiment of the present technology are capped with the hydroxy groups of the monoalcohol compound (C). Some of the isocyanate groups constituting reaction points are thus capped, which would presumably reduce adhesiveness to adherends in ordinary circumstances, but results in a superior adhesiveness to adherends in the case of the urethane composition according to an embodiment of the present technology.

The specific reasons for this are not clear but are assumed to be as follows.

Specifically, the capping of some of the reaction points of the urethane prepolymer (A) as described above reduces the curing rate of the urethane composition but ensures the fluidity of the compound (B). As a result, the compound (B), which is an adhesiveness-imparting component, presumably more easily moves to near the adhesive interface between the urethane composition and the adherend. In this way, the action of the compound (B) having moved to near the adhesive interface presumably yields a superior adhesiveness between the urethane composition and the adherend.

In addition, it is presumed that the concentration of urethane bonds in the prepolymer increases; thus, improving wettability with adherends.

The components and optional components of the urethane composition according to an embodiment of the present technology will be described hereafter.

Urethane Prepolymer (A)

The urethane composition according to an embodiment of the present technology contains a urethane prepolymer (A) having an isocyanate group. The urethane prepolymer (A) can be a known urethane prepolymer, as in a case of typical one-part urethane compositions. For example, a reaction product can be used which is obtained by reacting a polyisocyanate compound with an active hydrogen compound having two or more active hydrogen groups per molecule in a manner that the amount of the isocyanate group is in excess relative to the amount of the active hydrogen group.

The urethane prepolymer (A) may contain from 0.5 to 5 mass % of isocyanate groups at a molecular terminal.

Polyisocyanate Compound

The polyisocyanate compound used in the production of the urethane prepolymer (A) is not particularly limited as long as the polyisocyanate compound has two or more isocyanate groups in a molecule.

Specific examples of the polyisocyanate compound include aromatic polyisocyanates such as TDI (e.g. 2,4-tolylene diisocyanate (2,4-TDI) and 2,6-tolylene diisocyanate (2,6-TDI)), MDI (e.g. 4,4'-diphenylmethane diisocyanate (4,4'-MDI) and 2,4'-diphenylmethane diisocyanate (2,4'-MDI)), 1,4-phenylene diisocyanate, polymethylene polyphenylene polyisocyanate, xylylene diisocyanate (XDI), tetramethylxylylene diisocyanate (TMXDI), tolidine diisocyanate (TODI), 1,5-naphthalene diisocyanate (NDI), and triphenylmethane triisocyanate; aliphatic polyisocyanates such as hexamethylene diisocyanate (HDI), trimethylhexamethylene diisocyanate (TMHDI), lysine diisocyanate, and norbornane diisocyanate (NBDI); alicyclic polyisocyanates such as transcyclohexane-1,4-diisocyanate, isophorone diisocyanate (IPDI), bis(isocyanate methyl)cyclohexane ($H_6$XDI), and dicyclohexylmethane diisocyanate ($H_{12}$MDI); carbodiimide-modified polyisocyanates thereof; and isocyanurate-modified polyisocyanates thereof.

Such polyisocyanate compounds may be used alone, or a combination of two or more types of these polyisocyanate compounds may be used.

In particular, an aromatic polyisocyanate is preferable, TDI and/or MDI is more preferable, and MDI is even more preferable from the perspective of increasing the shear modulus of the urethane composition according to an embodiment of the present technology containing the resulting urethane prepolymer (A), and a better adhesiveness in high-temperature, high-humidity environments.

Active Hydrogen Compound Having Two or More Active Hydrogen Groups Per Molecule

The active hydrogen compound having two or more active hydrogen groups per molecule, which is used in the production of the urethane prepolymer (A), is not particularly limited.

Preferred examples of the active hydrogen compound include polyol compounds having two or more hydroxy (OH) groups per molecule, polyamine compounds having two or more amino group(s) and/or imino group(s) per molecule. Among these, a polyol compound is more preferable.

The polyol compound is not particularly limited with respect to its molecular weight, backbone, and the like as long as the polyol compound has two or more OH groups. Specific examples include low-molecular-weight polyhydric alcohols, polyether polyols, polyester polyols, other types of polyols, and mixtures of these polyols.

Specific examples of the low-molecular-weight polyhydric alcohols include low-molecular-weight polyols such as ethylene glycol (EG), diethylene glycol, propylene glycol (PG), dipropylene glycol, 1,3-butanediol, 1,4-butanediol, pentanediol, neopentyl glycol, hexanediol, cyclohexanedimethanol, glycerin, trimethylolpropane (TMP), 1,2,5-hexanetriol, and pentaerythritol; and sugars such as sorbitol.

As the polyether polyols and polyester polyols, compounds derived from the low-molecular-weight polyhydric alcohols are typically used, but in an embodiment of the present technology, compounds derived from aromatic diols, amines, and alkanolamines described below may also be favorably used.

Specific examples of the aromatic diols include resorcin (m-dihydroxybenzene), xylylene glycol, 1,4-benzene dimethanol, styrene glycol, 4,4'-dihydroxyethyl phenol; and compounds having bisphenol backbones having a bisphenol A structure (4,4'-dihydroxyphenylpropane), a bisphenol F structure (4,4'-dihydroxyphenylmethane), a brominated bisphenol A structure, a hydrogenated bisphenol A structure, a bisphenol S structure, or a bisphenol AF structure as described below.

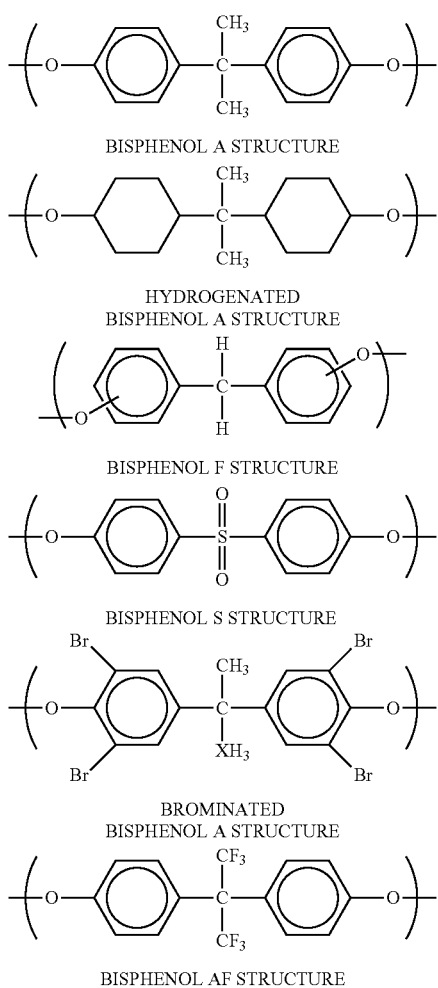

BISPHENOL A STRUCTURE

HYDROGENATED BISPHENOL A STRUCTURE

BISPHENOL F STRUCTURE

BISPHENOL S STRUCTURE

BROMINATED BISPHENOL A STRUCTURE

BISPHENOL AF STRUCTURE

Additionally, specific examples of the amines include ethylenediamine, and hexamethylenediamine. Specific examples of the alkanolamine include ethanolamine, and propanolamine.

Examples of the polyether polyols include polyols obtained by adding at least one type selected from styrene oxide; alkylene oxides such as ethylene oxide, propylene oxide, butylene oxide (tetramethylene oxide), and tetrahydrofuran; or the like, to at least one type selected from the compounds that are exemplified as the low-molecular-weight polyhydric alcohols, the aromatic diols, the amines, and the alkanolamines described above.

Specific examples of the polyether polyol include polyethylene glycol, polypropylene glycol (PPG), polypropylene triol, ethylene oxide/propylene oxide copolymers, polytetramethylene ether glycol (PTMEG), polytetraethylene glycol, and sorbitol polyol.

Likewise, examples of the polyester polyol include the condensation products (condensed polyester polyols) of any of the low-molecular-weight polyhydric alcohols, the aromatic diols, the amines, or the alkanolamines with a polybasic carboxylic acid; lactone polyols; and polycarbonate polyols.

Specific examples of the polybasic carboxylic acids that may be used to form the condensed polyester polyol include glutaric acid, adipic acid, azelaic acid, fumaric acid, maleic acid, pimelic acid, suberic acid, sebacic acid, phthalic acid, terephthalic acid, isophthalic acid, dimer acid, pyromellitic acid, other low-molecular-weight carboxylic acids, oligomeric acids, castor oil, and hydroxycarboxylic acids such as a reaction product of castor oil and ethylene glycol (or propylene glycol).

In addition, specific examples of the lactone polyols include compounds that are obtained via ring-opening polymerization of a lactone such as ε-caprolactone, α-methyl-ε-caprolactone, or ε-methyl-ε-caprolactone with a suitable polymerization initiator, and that have hydroxy groups at both terminals.

Examples of the other polyols include polymeric polyols having carbon-carbon bonds in the main-chain backbone, such as acrylic polyols, polybutadiene polyols, and hydrogenated polybutadiene polyols.

In an embodiment of the present technology, the various types of polyol compounds exemplified above may be used alone or may be used in a combination of two or more types.

Among these, the polyol compound is preferably polypropylene glycol for the sake of achieving a superior balance between hardness and elongation at break of the urethane composition according to an embodiment of the present technology containing the resulting urethane prepolymer (A), as well as achieving a superior cost balance.

A polyol with a weight average molecular weight of approximately 100 to 10000 is preferable, and a polyol with a weight average molecular weight of 1000 to 5000 is more preferable. When the weight average molecular weight is within this range, the physical properties (e.g. hardness, strength at break, and elongation at break) and the viscosity of the resulting urethane prepolymer (A) is favorable.

Specific examples of the polyamine compound include aliphatic polyamines such as ethylenediamine, propylenediamine, butylenediamine, diethylenetriamine, tri ethylenetriamine, tri ethylenetetramine, tetraethylenepentamine, pentaethylenehexamine, hexamethylenediamine, trimethylhexamethylenediamine, 1,2-propanediamine, iminobispropylamine, methyliminobispropylamine, and 1,5-diamino-2-methylpentane (MPMD, available from Dupont K. K.); aromatic polyamines such as meta-phenylenediamine, ortho-phenylenediamine, para-phenylenediamine, m-xylylenediamine (MXDA), diaminodiphenyl methane, diaminodiphenyl sulfone, and diamino diethyldiphenylmethane; N-aminoethylpiperazine; monoamine having an ether bond in the main chain, such as 3-butoxyisopropylamine; diamines having a polyether backbone, which is exemplified by JEFFAMINE EDR148 available from Sun Techno Chemicals Co., Ltd.; alicyclic polyamines such as isophoronediamine, 1,3-bisaminomethylcyclohexane (1,3BAC, available from Mitsubishi Gas Chemical Company, Inc.), 1-cyclohexylamino-3-aminopropane, and 3-aminomethyl-3,3,5-trimethyl-cyclohexylamine; diamines having a norbornane backbone, such as norbornanediamine (NBDA, available from Mitsui Chemicals, Inc.); polyamide amines having an amino group at a molecular terminal of polyamide; 2,5-dimethyl-2,5-hexamethylene diamine, menthenediamine, 1,4-bis(2-amino-2-methylpropyl)piperazine, JEFFAMINE D230 and JEFFAMINE D400 (available from Sun Techno Chemicals Co., Ltd., having polypropylene glycol (PPG) as a backbone). These polyamine compounds may be used alone or may be used in a combination of two or more types.

Among these, a diamine having a polyether backbone (JEFFAMINE) and hexamethylene diamine are preferable.

Compound (B)

The urethane polymer of an embodiment of the present technology contains a compound (B). The compound (B) is at least one type of compound selected from the group consisting of an aliphatic isocyanate compound and a modified product of an aliphatic isocyanate compound.

The aliphatic isocyanate compound is not particularly limited as long as the aliphatic isocyanate compound has two or more isocyanate groups per molecule, and examples include aliphatic polyisocyanates listed as examples of the polyisocyanate compound in the urethane prepolymer (A) above.

That is, specific examples of the aliphatic polyisocyanate compound include hexamethylene diisocyanate (HDI), trimethylhexamethylene diisocyanate (TMHDI), lysine diisocyanate, and norbornane diisocyanate (NBDI). These may be used alone or in combination.

Of these, HDI is an especially preferable as the aliphatic isocyanate compound from the perspective of a more superior adhesiveness to adherends.

Examples of the modified product of the aliphatic isocyanate compound include isocyanurates of the aliphatic isocyanate compounds, biurets of the aliphatic isocyanate compounds, and adducts of aliphatic isocyanate compounds and triols (reaction products of the aliphatic isocyanate compounds and triols), and these may be used alone or in combination.

The triol is not particularly limited as long as the triol has three hydroxy groups per molecule. Examples include 1,2,5-hexanetriol; 1,2,6-hexanetriol; 1,2,3-propanetriol (glycerin); 1,2,3-benzenetriol; 1,2,4-benzenetriol; trimethylolethane; and trimethylolpropane (TMP), and trimethylolpropane (TMP) is preferable.

Specific examples of the "aliphatic isocyanate compound" in the modified product of the aliphatic isocyanate compound are as stated above, and HDI is preferable from the perspective of a better adhesiveness to adherends.

From the perspective of a better adhesiveness to diverse adherends (especially coated plate, resins such as PBT, glass primers, etc.) in a wide range of adhesion conditions from low temperatures to high temperatures, the compound (B) is preferably a modified product of an aliphatic isocyanate compound; more preferably at least one type selected from the group consisting of isocyanurates of the aliphatic isocyanate compounds, biurets of the aliphatic isocyanate compounds, and adducts of an aliphatic isocyanate compound and a triol; and more preferably at least one type selected from the group consisting of an HDI biuret, an HDI isocyanate, and an adduct of HDI and trimethylolpropane. Specific examples of the structures of these compounds will be given hereinafter.

HDI Isocyanurate

An HDI isocyanurate is a compound represented by the following Formula (1).

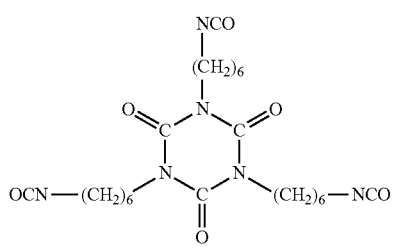

HDI Biuret

An HDI biuret is a compound represented by Formula (2) represented by the following Formula (2).

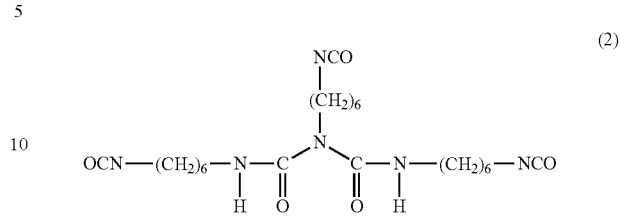

Adduct of HDI and TMP

Preferable HDI and TMP adducts (reaction products of HDI and TMP) have three isocyanate groups, and preferable examples thereof include a compound represented by the following Formula (3).

The reaction between HDI and TMP is preferably performed by mixing HDI and TMP in a manner that the equivalent ratio of isocyanate groups/hydroxide group (the number of isocyanate groups per one hydroxide group) (hereinafter, referred to as "NCO/OH") is from 1.8 to 2.2.

An adduct of HDI and TMP can be prepared, for example, by heating and stirring HDI and TMP at the equivalent ratio stated above at 50 to 100° C. Urethanation catalysts, such as organotin compounds, organic bismuth, and amine, can be also used as necessary.

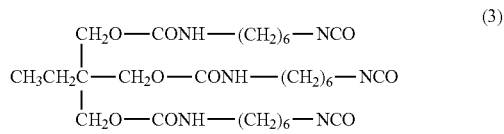

The compound (B) content of the urethane composition according to an embodiment of the present technology is preferably from 0.5 to 5.0 parts by mass, more preferably from 1.0 to 4.0 parts by mass, still more preferably from 1.0 to 3.5 parts by mass, per 100 parts by mass of the urethane prepolymer (A). Having the compound (B) content be at least 0.5 parts by mass will yield a better adhesiveness to diverse adherends (especially coated plate, resins such as PBT, glass primers, etc.) in a wide range of adhesion conditions from low temperatures to high temperatures. Having the compound (B) content be not more than 5.0 parts by mass will prevent residual bubbles in the adhesive, even when the urethane composition is cured at a high temperature and at a high humidity (i.e., the urethane composition will resist foaming).

Monoalcohol Compound (C)

The urethane composition of an embodiment of the present technology contains a monoalcohol compound (C). The monoalcohol compound (C) is an alcohol having one hydroxy (OH) group per molecule.

Examples of the monoalcohol compound (C) include aliphatic alcohols and aromatic alcohols, and aliphatic alcohols are preferable from the perspective of reactivity with isocyanate groups.

The aliphatic alcohol may be any of straight-chained, branched, and cyclic, and may be either saturated or unsaturated.

Specific examples of the monoalcohol compound (C) include aliphatic alcohols such as methanol, ethanol, propanol, 2-propene-1-ol, butanol, 2-methyl-2-propanol, pentanol, 3-methyl-1-butanol, hexanol, cyclohexanol, heptanol, octanol, 2-ethylhexanol, nonanol, decanol, undecanol, tridecanol, tetradecanol, hexadecanol, and octadecanol; and aromatic alcohols such as benzyl alcohol.

From the perspective of ease of handling and the physical properties of cured product of the urethane composition, the monoalcohol compound (C) is preferably a monoalcohol compound having from 1 to 18 carbons, more preferably a monoalcohol compound having from 2 to 12 carbons, and still more preferably a monoalcohol compound having from 6 to 10 carbons. In particular, a monoalcohol compound having at least 2 carbons can inhibit volatilization of the monoalcohol compound, and thus reduce the amount of the monoalcohol compound that volatilizes before the reaction. This can minimize variations in the properties of the urethane composition resulting from reaction volume (reaction rate). A monoalcohol compound having not more than 12 carbons can reduce the amount added per unit of capped moles; thus, yielding better physical properties of the cured product. Using a monoalcohol compound having from 2 to 12 carbons in this way yields a superior balance between obtaining a urethane composition having a superior stability and minimizing reductions in the physical properties of the cured product.

The monoalcohol compound (C) is blended in an amount such that the amount of the hydroxy groups in the monoalcohol compound (C) is from 0.025 to 0.4 mol, preferably such that the amount of the hydroxy groups in the monoalcohol compound (C) is from 0.025 to 0.25 mol, and more preferably such that the amount of the hydroxy groups in the monoalcohol compound (C) is from 0.15 to 0.23 mol, per 1 mol of the isocyanate groups in the urethane prepolymer (A).

Having the amount of substance of the hydroxy groups be at least 0.025 mol can reduce time until adhering to coated plates is manifest. Having the amount of substance of the hydroxy groups be not more than 0.4 mol results in a superior adhesiveness to glass primers. In particular, having the amount of substance of the hydroxy groups be not more than 0.23 mol results in superior rubber physical properties (especially elongation at break) of the cured product of the urethane composition.

Alkoxysilyl Compound (D)

The urethane composition according to an embodiment of the present technology preferably contains an alkoxysilyl compound (D) having an alkoxysilyl group. This will further improve adhesiveness (especially a water-resistant adhesiveness) between the urethane composition and adherends. This effect becomes more prominent in a case where an adherend including a coating material layer on its surface is used, and even more prominent in a case where the coating material forming the coating material layer (hereafter also referred to as the "adherend coating material") contains a silicone resin. Specifically, it is presumed that silanol groups produced by a hydrolysis reaction of the alkoxysilyl groups improve wettability with the adherend coating material and form hydrogen bonds with the silanol groups on the surface of the adherend coating material; thus, further improving adhesiveness (especially a water-resistant adhesiveness).

The alkoxysilyl compound (D) has at least one alkoxysilyl group per molecule.

As used herein, "alkoxysilyl group" refers to a group in which from 1 to 3 alkoxy groups (such as a methoxy group, an ethoxy group, and a propoxy group) are bonded to a silicon atom.

Examples of the groups bonded to the silicon atom other than alkoxy groups, in a case where 1 or 2 alkoxy groups are bonded to the silicon atom, include a hydrogen atom and an alkyl group (such as a methyl group and an ethyl group).

The alkoxysilyl group preferably has at least one type of alkoxy group selected from the group consisting of a methoxy group and an ethoxy group.

Specific examples of the alkoxysilyl group include a monomethoxysilyl group, a dimethoxysilyl group, a trimethoxysilyl group, a monoethoxysilyl group, a diethoxysilyl group, a triethoxysilyl group, a dimethoxy methylsilyl group, a dimethoxy ethylsilyl group, a diethoxy methylsilyl group, a diethoxy ethylsilyl group, an ethoxy(dimethoxy) silyl group, and a methoxy(diethoxy)silyl group.

The number of alkoxy groups bonded to the silicon atom in the alkoxysilyl groups included in the alkoxysilyl compound (D) is preferably 2 or 3. This will further improve adhesiveness between the urethane composition and adherends.

The alkoxysilyl compound (D) preferably has at least one active hydrogen per molecule. This will result in a reaction between the active hydrogen in the alkoxysilyl compound (D) and the isocyanate groups in the urethane prepolymer (A) and/or the compound (B); thus, further improving adhesiveness between the urethane composition according to an embodiment of the present technology and adherends.

The active hydrogen is introduced into the alkoxysilyl compound (D) in the form of an active hydrogen group. Examples of such an active hydrogen group include amino groups (such as a primary amino group and a secondary amino group) and mercapto groups.

The alkoxysilyl compound (D) preferably has at least one active hydrogen per molecule, and preferably has only one active hydrogen per molecule from the perspective of a superior storage stability (viscosity stability) of the urethane composition.

The alkoxysilyl group and the active hydrogen group introduced as necessary in the alkoxysilyl compound (D) are preferably bonded to an organic group. Examples of such an organic group include at least one type selected from the group consisting of aliphatic hydrocarbon groups, alicyclic hydrocarbon groups, and aromatic hydrocarbon groups.

Examples of the alkoxysilyl compound (D) include: aminosilane compounds having a primary amino group, such as 3-aminopropyltrimethoxysilane and 3-aminopropyltriethoxysilane; aminosilane compounds having a secondary amino group, such as N,N-bis[(3-trimethoxysilyl)propyl]amine, N,N-bis[(3-triethoxysilyl)propyl]amine, N,N-bis[(3-tripropoxysilyl)propyl]amine, 3-(n-butylamino)propyltrimethoxysilane, 3-(n-propylamino)propyltrimethoxysilane, and N-phenyl-γ-aminopropyltrimethoxysilane; and compounds having mercapto groups (mercaptosilane compounds), such as γ-mercaptopropyltrimethoxysilane, γ-mercaptopropyltriethoxysilane, γ-mercaptopropylmethyldimethoxysilane, γ-mercaptopropylmethyldiethoxysilane, and γ-mercaptopropylethyldiethoxysilane.

These alkoxysilyl compounds (D) may be used alone or in combination.

Of these alkoxysilyl compounds (D), an aminosilane compound having a secondary amino group is preferable, and an aminosilane compound having a secondary amino group bonded to an aromatic hydrocarbon group is more preferable, from the perspective of a superior storage stability (viscosity stability) of the urethane composition.

In a case where the urethane composition of an embodiment of the present technology contains an alkoxysilyl compound (D), the alkoxysilyl compound content is preferably from 0.08 to 10.2 parts by mass, more preferably from 0.08 to 10.0 parts by mass, still more preferably from 0.10 to 10.0 parts by mass, per total 100 parts by mass of the urethane prepolymer (A) and the compound (B). Having the alkoxysilyl compound (D) content be at least 0.08 parts by mass results in a better water-resistant adhesiveness to diverse adherends (especially coated plates). Having the alkoxysilyl compound (D) content be not more than 10.2 parts by mass will yield a better adhesiveness to diverse adherends (especially coated plate, resins such as PBT, glass primers, etc.) in a wide range of adhesion conditions from low temperatures to high temperatures.

Additives

The urethane composition according to an embodiment of the present technology may optionally contain components (additives) other than those described above. Examples of the additives include carbon blacks, catalysts, and plasticizers.

Carbon Black

A known carbon black can be used, as in a case of ordinary one-part urethane compositions.

Examples of the carbon black include SAF (Super Abrasion Furnace), ISAF (Intermediate Super Abrasion Furnace), HAF (High Abrasion Furnace), FEF (Fast Extruding Furnace), GPF (General Purpose Furnace), SRF (Semi-Reinforcing Furnace), FT (Fine Thermal), and MT (Medium Thermal).

Specific examples include SEAST 9 (available from Tokai Carbon Co., Ltd.) for SAF, Showa Black N 220 (available from Showa Cabot K. K.) for ISAF, SEAST 3 (available from Tokai Carbon Co., Ltd.) and Niteron #200 (available from NSCC Carbon Co., Ltd.) for HAF, and HTC #100 (available from Chubu Carbon) for FEF. Further examples include Asahi #55 (available from Asahi Carbon Co., Ltd.) and SEAST 5 (available from Tokai Carbon Co., Ltd.) for GPF, Asahi #50 (available from Asahi Carbon Co., Ltd.) and Mitsubishi #5 (available from Mitsubishi Chemical Corporation) for SRF, Asahi Thermal (available from Asahi Carbon Co., Ltd.) and HTC #20 (available from Chubu Carbon K. K.) for FT, and Asahi #15 (available from Asahi Carbon Co., Ltd.) for MT. These may be used alone or in combinations of two or more types.

In an embodiment of the present technology, the carbon black content is preferably from 20 to 100 parts by mass, more preferably from 30 to 80 parts by mass, per 100 parts by mass of the urethane prepolymer (A).

Catalyst

A known curing catalyst can be used as a catalyst, as in a case of ordinary one-part urethane compositions.

Specific examples of the catalyst include lead octylate; tin catalysts such as dioctyltin dilaurate, dibutyltin laurate, and tin octylate; tertiary amines such as trimethylamine, triethylamine, tripropylamine, tributylamine, triamylamine, trihexylamine, trioctylamine, trilaurylamine, dimethyl ethyl amine, dimethylpropylamine, dimethylbutylamine, dimethyl amyl amine, dimethylhexylamine, dimethylcyclohexylamine, dimethyloctylamine, dimethyllaurylamine, triallylamine, tetramethylethylenediamine, triethylenediamine, N-methylmorpholine, 4,4'-(oxydi-2,1-ethanediyl)bis-morpholine, N,N-dimethylbenzylamine, pyridine, picoline, dimethyl aminomethylphenol, trisdimethylaminomethylphenol, 1,8-diazabicyclo[5.4.0]undecene-1,1,4-diazabicyclo[2.2.2]octane, triethanolamine, N,N'-dimethylpiperazine, tetramethyl butanediamine, bis(2,2-morpholinoethyl)ether, and bis(dimethylaminoethyl)ether. These may be used alone or in combinations of two or more types.

The catalyst content is preferably from 0.001 to 1.0 parts by mass, more preferably from 0.01 to 0.5 parts by mass, per 100 parts by mass of the urethane prepolymer (A).

Plasticizer

A known plasticizer can be used as a plasticizer, as in a case of ordinary one-part urethane compositions.

Specific examples of the plasticizer include diisononyl phthalate (DINP); dioctyl adipate and indecyl succinate; di(ethylene glycol) dibenzoate and pentaerythritol esters; butyl oleate and methyl acetyl ricinoleate; tricresyl phosphate and trioctyl phosphate; and propylene glycol adipate polyesters and butylene glycol adipate polyesters. These may be used alone or in combinations of two or more types.

The plasticizer content is preferably from 10 to 80 parts by mass, more preferably from 15 to 60 parts by mass, per 100 parts by mass of the urethane prepolymer (A).

Other additives

The urethane composition according to an embodiment of the present technology may, as necessary, contain additives other than the carbon black, catalyst, and plasticizer to the extent that the object of the present technology is not impeded. Specific examples of the additive include various additives such as fillers other than carbon black, anti-aging agents, antioxidants, pigments (dyes), thixotropic agents, UV absorbents, flame retardants, surfactants (including leveling agents), dispersants, dehydrating agents, adhesion promoters, and antistatic agents.

Examples of the fillers other than carbon black include organic or inorganic fillers of any form. Specific examples include fumed silica, calcined silica, precipitated silica, pulverized silica, molten silica; diatomaceous earth; iron oxide, zinc oxide, titanium oxide, barium oxide, magnesium oxide; calcium carbonate, heavy calcium carbonate, precipitated calcium carbonate (light calcium carbonate), colloidal calcium carbonate, magnesium carbonate, zinc carbonate; pyrophyllite clay, kaolin clay, calcined clay; and fatty acid treated products, resin acid treated products, urethane compound treated products, and fatty acid ester treated products thereof. One type of these may be used alone, or two or more types of these may be used in combination.

Specific examples of the anti-aging agent include compounds such as a hindered phenol compound.

Specific examples of the antioxidant include butylhydroxytoluene (BHT) and butylhydroxyanisole (BHA).

Specific examples of the pigment include inorganic pigments such as titanium oxide, zinc oxide, ultramarine, iron red, lithopone, lead, cadmium, iron, cobalt, aluminum, hydrochlorides, and sulfates; and organic pigments such as azo pigments, phthalocyanine pigments, quinacridone pigments, quinacridonequinone pigments, dioxazine pigments, anthrapyrimidine pigments, anthanthrone pigments, indanthrone pigments, flavanthrone pigments, perylene pigments, perinone pigments, diketopyrrolopyrrole pigments, quinonaphthalone pigments, anthraquinone pigments, thioindigo pigments, benzimidazolone pigments, isoindoline pigments, and carbon blacks.

Specific examples of the thixotropic agent include Aerosil (available from Nippon Aerosil), and Disparlon (available from Kusumoto Chemicals, Ltd.).

Specific examples of the adhesion promoter include terpene resins, phenol resins, terpene-phenol resins, rosin resins, and xylene resins.

Specific examples of the flame retardant include chloroalkyl phosphates, dimethyl-methyl phosphates, bromine-phosphorus compounds, ammonium polyphosphates, neopentyl bromide polyethers, and brominated polyethers.

Specific examples of the antistatic agent include quaternary ammonium salts; hydrophilic compounds such as polyglycols, and ethylene oxide derivatives.

Production Method of Urethane Composition

The method is not limited by which the urethane composition according to an embodiment of the present technology is produced. For example, the urethane prepolymer (A), the compound (B), the monoalcohol compound (C), the alkoxysilyl compound (D), and/or various additives optionally added as desired are mixed, thoroughly mixed and homogeneously dispersed (kneaded) at room temperature or while being heated (to, for example, 30 to 80° C.) using a kneader, extruder, general purpose agitator, or the like to produce the composition.

Use of Urethane Composition

Non-limiting examples of uses of the urethane composition according to the present technology include automobile sealing agents, construction material sealing agents, and adhesives for resin parts or metal parts.

EXAMPLES

The urethane composition according to an embodiment of the present technology will be described in detail hereafter with reference to examples. However, the present technology is not limited to these examples.

Urethane Prepolymer (A)

A urethane prepolymer (A) having an isocyanate group content of 1.95% was synthesized by mixing 500 g of polyoxypropylene diol (average molecular weight: 2000), 750 g of polyoxypropylene triol (average molecular weight: 5000), and 214 g of 4,4'-diisocyanate phenylmethane (molecular weight: 250) (at this time, NCO/OH=1.8), further adding 160 g of diisononyl phthalate, and stirring the mixture in a nitrogen gas stream at 80° C. for 24 hours to effect a reaction.

Compound (B)

An HDI isocyanurate represented by Formula (1) (D170N; available from Mitsui-Takeda Urethane Chemicals) was used as the compound (B).

Monoalcohol Compound (C)

2-ethylhexanol (available from Kanto Chemical Co., Ltd.) was used as the monoalcohol compound (C).

Additives

Carbon black: Niteron #200 (available from NSCC Carbon Co., Ltd.)

Catalyst: dioctyltin laurate (NEOSTANN U-810, available from Nitto Kasei Co., Ltd.)

Plasticizer: diisononyl phthalate (DINP, available from J-Plus Co., Ltd.)

Examples 1 to 5, Comparative Examples 1 to 3

The various components listed in Table 1 below were mixed according to the compositions listed in Table 1 at 50° C. using an agitator to obtain the urethane compositions of Examples 1 to 5 and Comparative Examples 1 to 3 listed in Table 1.

In Table 1 below, the amount of the monoalcohol compound (C) blended is expressed in terms of the amount of substance (mol) of hydroxy groups in the monoalcohol compound (C) per 1 mol of isocyanate groups in urethane prepolymer (A). The blended amounts of the components other than the monoalcohol compound (C) are in terms of parts by mass.

Evaluation Tests

Adhesiveness Test 1 (Coated Plate Adhesion)

The urethane composition was directly applied, without using a primer, at ø10 mm to a coated plate obtained by applying a coating material (acrylic/silicone coating material) to a steel sheet, compression bonding was performed after five minutes so as to yield a cured thickness of 3 mm then left to stand according to the following conditions 1-1 to 1-6, and the urethane composition was cured to produce a test piece. Humidity was set at 50% RH in all conditions.

A manual peel test was then performed by scoring the produced test piece with a knife, and a failure state was observed. The evaluation results are shown in Table 1.

Evaluation ratings were "CF" for urethane compositions of a superior adhesiveness in which the entirety of the cured product of the urethane composition exhibited a cohesive failure and did not exhibit an interfacial failure, and "AF" for cases in which the cured product of the urethane composition was peeled at the interface with the coated plate. The number appended to "AF" indicates the proportion (%) of the area of the region in which an interfacial failure occurred with respect to the total area in which the cured product of the urethane composition has been peeled.

(Conditions 1-1) After applying the urethane composition, the coated plate was left to stand at 23° C. for 3 days.

(Conditions 1-2) After applying the urethane composition, the coated plate was left to stand at 23° C. for 7 days.

(Conditions 1-3) After applying the urethane composition, the coated plate was left to stand at 23° C. for 10 days.

(Conditions 1-4) After applying the urethane composition, the coated plate was left to stand at 5° C. for 7 days.

(Conditions 1-5) After applying the urethane composition, the coated plate was left to stand at 5° C. for 14 days.

(Conditions 1-6) After applying the urethane composition, the coated plate was left to stand at 5° C. for 21 days.

Adhesiveness Test 2 (Glass Adhesion)

Beads (ø10 mm) of the urethane compositions prepared in the examples and comparative examples were applied to an adherend (glass coated with a primer (MS-90, available from The Yokohama Rubber Co., Ltd.)), compression-bonded to a thickness of 3 mm, and then left to stand according to the following conditions 2-1 to 2-4 to cure the urethane compositions; thus, producing test pieces. Humidity was set at 50% RH in all conditions.

A manual peel test was then performed by scoring the produced test piece with a knife, and a failure state was observed. The evaluation results are shown in Table 1.

Evaluation ratings were "CF" for urethane compositions of a superior adhesiveness in which the entirety of the cured composition exhibited a cohesive failure and did not exhibit an interfacial failure, and "PS" for cases in which the cured urethane composition has been peeled at the interface with the primer. The number appended to "PS" indicates the proportion (%) of the area of the region in which an interfacial failure occurred with respect to the total area in which the cured urethane composition has been peeled.

(Conditions 2-1): The test piece was left to stand for 7 days in conditions of 23° C.

(Conditions 2-2): The test piece was left to stand for 7 days in conditions of 23° C., then for 14 days in conditions of 100° C.

(Conditions 2-3): The test piece was left to stand for 7 days in conditions of 23° C., then for 21 days in conditions of 100° C.

(Conditions 2-4): The test piece was left to stand for 7 days in conditions of 23° C., then for 28 days in conditions of 100° C.

Rubber Physical Properties (Elongation at Break)

The cured compositions were cut into dumbbell-shaped test pieces with a thickness of 2 mm (No. 3 dumbbell shape), and elongation at break (%) was measured in accordance with JIS (Japanese Industrial Standard) K 6251:2010.

The measurement results are shown in Table 1.

Evaluation Results

The results of the evaluation tests are shown in Table 1.

TABLE 1

| | | | Example 1 | Example 2 | Example 3 | Example 4 | Example 5 |
|---|---|---|---|---|---|---|---|
| Composition | | Urethane prepolymer (A) | 99 parts | 99 parts | 99 parts | 99 parts | 99 parts |
| | | Compound (B) | 1 part | 1 part | 1 part | 1 part | 1 part |
| | | Monoalcohol compound (C) | 0.025 mol | 0.2 mol | 0.25 mol | 0.3 mol | 0.4 mol |
| | Additive | Plasticizer | 25 parts | 25 parts | 25 parts | 25 parts | 25 parts |
| | | Carbon black | 50 parts | 50 parts | 50 parts | 50 parts | 50 parts |
| | | Catalyst | 0.21 parts | 0.21 parts | 0.21 parts | 0.21 parts | 0.21 parts |
| Adhesiveness test 1 (Coated sheet adhesion) | Conditions 1-1 | (23° C. × 3 days) | AF30 | CF | CF | CF | CF |
| | Conditions 1-2 | (23° C. × 7 days) | CF | CF | CF | CF | CF |
| | Conditions 1-3 | (23° C. × 10 days) | CF | CF | CF | CF | CF |
| | Conditions 1-4 | (5° C. × 7 days) | AF80 | CF | CF | CF | CF |
| | Conditions 1-5 | (5° C. × 14 days) | AF50 | CF | CF | CF | CF |
| | Conditions 1-6 | (5° C. × 21 days) | CF | CF | CF | CF | CF |
| Adhesiveness test 2 (glass adhesion) | Conditions 2-1 | (23° C. × 7 days) | CF | CF | CF | CF | CF |
| | Conditions 2-2 | (23° C. × 7 days → 100° C. × 14 days) | CF | CF | CF | CF | CF |
| | Conditions 2-3 | (23° C. × 7 days → 100° C. × 21 days) | CF | CF | CF | CF | PS10 |
| | Conditions 2-4 | (23° C. × 7 days → 100° C. × 28 days) | CF | CF | CF | PS30 | PS30 |
| Rubber physical properties | | Elongation at break (%) | 380 | 390 | 300 | 290 | 290 |

| | | | Comparative Example 1 | Comparative Example 2 | Comparative Example 3 |
|---|---|---|---|---|---|
| Composition | | Urethane prepolymer (A) | 99 parts | 99 parts | 100 parts |
| | | Compound (B) | 1 part | 1 part | 0 parts |
| | | Monoalcohol compound (C) | 0.023 mol | 0.45 mol | 0.25 mol |
| | Additive | Plasticizer | 25 parts | 25 parts | 25 parts |
| | | Carbon black | 50 parts | 50 parts | 50 parts |
| | | Catalyst | 0.21 parts | 0.21 parts | 0.21 parts |
| Adhesiveness test 1 (Coated sheet adhesion) | Conditions 1-1 | (23° C. × 3 days) | AF70 | CF | AF100 |
| | Conditions 1-2 | (23° C. × 7 days) | AF30 | CF | AF100 |
| | Conditions 1-3 | (23° C. × 10 days) | CF | CF | AF90 |

TABLE 1-continued

|  | Conditions 1-4 | (5° C. × 7 days) | AF100 | CF | AF100 |
|---|---|---|---|---|---|
|  | Conditions 1-5 | (5° C. × 14 days) | AF100 | CF | AF100 |
|  | Conditions 1-6 | (5° C. × 21 days) | AF70 | CF | AF100 |
| Adhesiveness test 2 (glass adhesion) | Conditions 2-1 | (23° C. × 7 days) | CF | PS80 | PS100 |
|  | Conditions 2-2 | (23° C. × 7 days → 100° C. × 14 days) | CF | PS100 | — |
|  | Conditions 2-3 | (23° C. × 7 days → 100° C. × 21 days) | CF | — | — |
|  | Conditions 2-4 | (23° C. × 7 days → 100° C. × 28 days) | CF | — | — |
| Rubber physical properties | Elongation at break (%) |  | 380 | 280 | 350 |

As shown in Table 1, the urethane compositions of Examples 1 to 5, in which the monoalcohol compound (C) was blended in an amount such that the amount of the hydroxy groups in the monoalcohol compound (C) is from 0.025 to 0.4 mol per 1 mol of the isocyanate groups in the urethane prepolymer (A), exhibited a superior adhesiveness to the adherends.

A comparison of Examples 1 to 5 shows that the urethane compositions of Examples 1 and 2, in which the monoalcohol compound (C) was blended in an amount such that the amount of the hydroxy groups in the monoalcohol compound (C) is from 0.23 mol or less per 1 mol of the isocyanate groups in the urethane prepolymer (A), exhibited better rubber physical properties (elongation at break) than the urethane compositions of Examples 3 to 5.

In the urethane composition of Comparative Example 1, by contrast, the amount of substance of the hydroxy groups in the monoalcohol compound (C) contained therein was less than 0.025 mol, with the result that the composition exhibited an inferior adhesiveness to coated plates.

In the urethane composition of Comparative Example 2, the amount of substance of the hydroxy groups in the monoalcohol compound (C) contained therein was greater than 0.4 mol, with the result that the composition exhibited an inferior adhesiveness to glass.

The urethane composition of Comparative Example 3 did not contain the compound (B) and thus exhibited inferior adhesiveness to the coated steel plate.

Examples 6 to 9

Urethane compositions according to Examples 6 to 9 were prepared as in the case of Example 2 above, except that an alkoxysilyl compound (D) (trade name "KBM-573", available from Shin-Etsu Chemical; N-phenyl-3-aminopropyltrimethoxysilane) was added when preparing the urethane compositions.

In Table 2 below, the amount of monoalcohol compound (C) blended is expressed in terms of the amount of substance (mol) of hydroxy groups in the monoalcohol compound (C) per 1 mol of isocyanate groups in the urethane prepolymer (A). The blended amounts of the components other than the monoalcohol compound (C) are in terms of parts by mass.

Evaluation Tests

Adhesiveness Test 1 (Coated Plate Adhesion)

The adhesiveness test 1 described above was performed as in the case of Example 2, except that the urethane compositions of Examples 6 to 9 were used. The evaluation results are shown in Table 2.

Adhesiveness Test 2 (Glass Adhesion)

The adhesiveness test 2 described above was performed as in the case of Example 2, except that the urethane compositions of Examples 6 to 9 were used. The evaluation results are shown in Table 2.

Adhesiveness Test 3 (Water-Resistant Adhesiveness)

The urethane compositions of Example 2 and Examples 6 to 9 were directly applied, without using a primer, at ø10 mm to a coated plate A (acid-epoxy curing) or coated plate B (acrylic/silicone coating material applied to sheet steel), compression bonded after five minutes so as to yield a cured thickness of 3 mm, and then left to stand for 3 days at 20° C.; and the urethane composition was cured to produce test pieces. Humidity was set at 50% RH in all conditions.

Next, the test pieces were immersed in 40° C. warm water for 14 days, then removed from the warm water and dried for 24 hours at 20° C.

A manual peel test was then performed by scoring the produced test piece with a knife, and failure state was observed. The evaluation results are shown in Table 2.

Evaluation ratings were "CF" for urethane compositions of a superior adhesiveness in which the entirety of the cured product of the urethane composition exhibited cohesive failure and did not exhibit an interfacial failure, and "AF" for cases in which the cured product of the urethane composition was peeled at the interface with the coated plate. The number appended to "AF" indicates the proportion (%) of the area of the region in which an interfacial failure occurred with respect to the total area in which the cured product of the urethane composition has been peeled.

Rubber Physical Properties (Elongation at Break)

The rubber physical properties (elongation at break) described above were measured as in Example 2, except that the urethane compositions of Examples 6 to 9 were used. The evaluation results are shown in Table 2.

Evaluation Results

The results of the evaluation tests are shown in Table 2.

TABLE 2

| | | Example 2 | Example 6 | Example 7 | Example 8 | Example 9 |
|---|---|---|---|---|---|---|
| Composition | Urethane prepolymer (A) | 99 parts | 99 parts | 99 parts | 99 parts | 99 parts |
| | Compound (B) | 1 part | 1 part | 1 part | 1 part | 1 part |
| | Monoalcohol compound (C) | 0.2 mol | 0.2 mol | 0.2 mol | 0.2 mol | 0.2 mol |
| | alkoxysilyl compound (D) | 0 parts | 0.1 parts | 1.0 parts | 10.0 parts | 0.08 parts |
| | Additives Plasticizer | 25 parts | 25 parts | 25 parts | 25 parts | 25 parts |
| | Carbon black | 50 parts | 50 parts | 50 parts | 50 parts | 50 parts |
| | Catalyst | 0.21 parts | 0.21 parts | 0.21 parts | 0.21 parts | 0.21 parts |
| Adhesiveness test 1 (Coated sheet adhesion) | Conditions 1-1 (23° C. × 3 days) | CF | CF | CF | CF | CF |
| | Conditions 1-2 (23° C. × 7 days) | CF | CF | CF | CF | CF |
| | Conditions 1-3 (23° C. × 10 days) | CF | CF | CF | CF | CF |
| | Conditions 1-4 (5° C. × 7 days) | CF | CF | CF | CF | CF |
| | Conditions 1-5 (5° C. × 14 days) | CF | CF | CF | CF | CF |
| | Conditions 1-6 (5° C. × 21 days) | CF | CF | CF | CF | CF |
| Adhesiveness test 2 (glass adhesion) | Conditions 2-1 (23° C. × 7 days) | CF | CF | CF | CF | CF |
| | Conditions 2-2 (23° C. × 7 days → 100° C. × 14 days) | CF | CF | CF | CF | CF |
| | Conditions 2-3 (23° C. × 7 days → 100° C. × 21 days) | CF | CF | CF | CF | CF |
| | Conditions 2-4 (23° C. × 7 days → 100° C. × 28 days) | CF | CF | CF | CF | CF |
| Adhesiveness test 3 (water-resistant adhesiveness) | Coated plate A | CF | CF | CF | CF | CF |
| | Coated plate B | AF50 | CF | CF | CF | AF30 |
| Rubber physical properties | Elongation at break (%) | 390 | 390 | 420 | 450 | 390 |

As shown in Table 2, the urethane compositions of Examples 6 to 9, which contained the alkoxysilyl compound (D), exhibited a better water-resistant adhesiveness to adherends than the urethane composition of Example 2, which did not contain this compound.

The invention claimed is:

1. A one-part moisture-curable urethane composition comprising:
   a urethane prepolymer (A) comprising an isocyanate group;
   a compound (B) being a modified product of an aliphatic isocyanate compound; and
   a monoalcohol compound (C) comprising a hydroxy group;
   a content of the compound (B) being from 0.5 to 5.0 parts by mass per 100 parts by mass of the urethane prepolymer (A);
   the monoalcohol compound (C) being blended in an amount such that an amount of the hydroxy group in the monoalcohol compound (C) is from 0.025 to 0.4 mol per 1 mol of the isocyanate group in the urethane prepolymer (A),
   a number of carbons in the monoalcohol compound (C) being from 1 to 18; and
   the modified product of the aliphatic isocyanate compound being at least one type of modified product selected from the group consisting of an isocyanurate of the aliphatic isocyanate compound, a biuret of the aliphatic isocyanate compound, and an adduct of the aliphatic isocyanate compound and a triol.

2. The one-part moisture-curable urethane composition according to claim 1, wherein the aliphatic isocyanate compound is hexamethylene diisocyanate.

3. The one-part moisture-curable urethane composition according to claim 1, wherein the monoalcohol compound (C) is blended in an amount such that the amount of the hydroxy group in the monoalcohol compound (C) is from 0.15 to 0.23 mol per 1 mol of the isocyanate group in the urethane prepolymer (A).

4. The one-part moisture-curable urethane composition according to claim 3, wherein the aliphatic isocyanate compound is hexamethylene diisocyanate.

5. The one-part moisture-curable urethane composition according to claim 1, further comprising an alkoxysilyl compound (D) comprising an alkoxysilyl group, a content of the alkoxysilyl compound (D) being from 0.08 to 10.2 parts by mass per total 100 parts by mass of the urethane prepolymer (A) and the compound (B).

6. The one-part moisture-curable urethane composition according to claim 5, wherein the aliphatic isocyanate compound is hexamethylene diisocyanate.

7. The one-part moisture-curable urethane composition according to claim 5, wherein the alkoxysilyl compound (D) comprises one or more active hydrogens per molecule, and the alkoxysilyl group comprises at least one type of alkoxy group selected from the group consisting of a methoxy group and an ethoxy group.

8. The one-part moisture-curable urethane composition according to claim 7, wherein the aliphatic isocyanate compound is hexamethylene diisocyanate.

9. The one-part moisture-curable urethane composition according to claim 5, wherein the alkoxysilyl compound (D) is N-phenyl-3-aminopropyltrimethoxysilane, N,N-bis[(3-trimethoxysilyl)propyl]amine, γ-mercaptopropyltrimethoxysilane or γ-mercaptopropylmethyldimethoxysilane.

10. The one-part moisture-curable urethane composition according to claim 9, wherein the aliphatic isocyanate compound is hexamethylene diisocyanate.

\* \* \* \* \*